US005482760A

United States Patent [19]

Takeuchi

[11] Patent Number: 5,482,760

[45] Date of Patent: Jan. 9, 1996

[54] LIGHT-TRANSMITTING FILM AND METHOD FOR FORMING IMAGES USING THE SAME

[75] Inventor: Tatsuo Takeuchi, Kawasaki, Japan

[73] Assignee: Canon Kabushiki Kaisha, Tokyo, Japan

[21] Appl. No.: 380,338

[22] Filed: Jan. 30, 1995

Related U.S. Application Data

[63] Continuation of Ser. No. 782,331, Oct. 24, 1991, abandoned.

[30] Foreign Application Priority Data

| | | | |
|---|---|---|---|
| Oct. 26, 1990 | [JP] | Japan | 2-286959 |
| Oct. 26, 1990 | [JP] | Japan | 2-286960 |

[51] Int. Cl.$^6$ .......... B32B 9/00

[52] U.S. Cl. .......... 428/195; 428/76; 428/203; 428/204; 428/205; 428/409; 428/913; 428/914; 430/166; 430/201

[58] Field of Search .......... 428/409, 323, 428/484, 914, 328, 195, 913, 204, 76, 205, 203; 430/166, 201

[56] References Cited

U.S. PATENT DOCUMENTS

| | | | |
|---|---|---|---|
| 4,499,211 | 2/1985 | Walch et al. | 521/145 |
| 4,524,155 | 6/1985 | Walch et al. | 521/64 |
| 4,956,225 | 9/1990 | Malhotra | 428/216 |
| 5,032,440 | 7/1991 | Takeuchi et al. | 478/76 |
| 5,130,223 | 7/1992 | Nishimura et al. | 430/166 |
| 4,8523,274 | 8/1989 | Makishima et al. | 428/143 |

FOREIGN PATENT DOCUMENTS

| | | |
|---|---|---|
| 71169 | 2/1983 | European Pat. Off. . |
| 332183 | 9/1989 | European Pat. Off. . |
| 442567 | 8/1991 | European Pat. Off. . |
| 2304730 | 8/1973 | Germany . |
| 2644089 | 4/1978 | Germany . |
| 1423403 | 2/1976 | United Kingdom . |

OTHER PUBLICATIONS

Patent Abstracts of Japan, vol. 14, No. 94 (P-1010) (4037), Feb. 21, 1990 (JP-A-01 302 266) (Ricoh Co. Ltd.) Dec. 6, 1989.

*Primary Examiner*—Patrick J. Ryan
*Assistant Examiner*—Abraham Bahta
*Attorney, Agent, or Firm*—Fitzpatrick, Cella, Harper & Scinto

[57] ABSTRACT

An image light-transmitting transparent film comprises a first transparent resin layer which is a base film; and a second transparent resin layer, the surface of which is a roughened surface which can be smoothed out by heating and pressure, in which the roughened surface of the second transparent resin layer is formed of a second transparent resin and particles of a resin soluble into the second transparent resin.

15 Claims, 4 Drawing Sheets

LIGHT-TRANSMITTING FILM AND METHOD FOR FORMING IMAGES USING THE SAME

This application is a continuation of application Ser. No. 07/782,331 filed Oct. 24, 1991, now abandoned.

BACKGROUND OF THE INVENTION

1. Field of the Invention

The present invention relates to a transparent film for carrying a toner image formed by an electrophotographic or electrostatic printing method. More particularly, the present invention relates to transparent films for use with an overhead projector (OHP) or a slide projector and to a method for forming a color image on this transparent film.

2. Description of the Related Art

In the prior art, the following steps are generally performed: a mono-color image is formed on a film of, for example, transparent polyester, by an electrophotographic apparatus; images obtained are used with OHP or the like and used as projection images.

In recent years, full-color images are formed by using this electrophotographic apparatus. Present demand for outputting full-color images onto a transparent film as the above-mentioned projection image has risen. However, if a transparent film, the surface of which is smooth, is used, frictional resistance will increase between various parts which are brought into contact with the transparent film in a transport passage inside the electrophotographic apparatus, and this presents a problem in that the passage will become clogged.

In the prior art, means used to solve the above-described problem are the following. A thin film formed of resin containing inorganic fine particles called a mat agent, such as silicon dioxide or alumina, or starch or the like, is formed on the surface of such a transparent film as that described above. A dynamic friction resistance is appropriately adjusted by a roughened surface formed by these particles.

The average diameter (the average particle size) of surface-roughening particles (particles of a mat agent) used on that occasion is usually 0.2 to 20 μm. With surface-roughening particles of a size large enough that an adequate strongly surface roughness is achieved, the roughened surface disperses incident light, resulting in a decrease in the transparency of the transparent film. Because the amount of surface-roughening particles to be added must be increased to make the roughness uniform over the entire surface, this fact also causes a decrease in the light transmittance of a base film. As a result, problems arise in that a projected image becomes unclear, and color tone is likely to become gray on the whole when a projected image is a color image.

SUMMARY OF THE INVENTION

An object of the present invention is to provide an image transmitting transparent film which can be stably transported in a transport passage of an apparatus.

Another object of the present invention is to provide an image transmitting transparent film having excellent color-tone reproducibility of a projection image of an image which is formed.

A further object of the present invention is to provide a image transmitting transparent film having excellent color-tone reproducibility of a projection image of a color image which is formed.

The present invention relates to an image transmitting transparent film having a first transparent resin layer which is a base film and a second transparent resin layer the surface of which is a rough surface which can be smoothed by heating and pressure.

The present invention relates to a method for forming images, comprising the steps of: forming an image by using color toner particles having a binding resin which dissolves with the second transparent resin on the surface of this transparent film; fixing the image on a transparent film by heating and pressing; and smoothing the roughened surface of the second resin layer.

According to the present invention, a stable transport of films in a transport passage of an image forming apparatus is made possible by lowering the friction resistance because the surface of the transparent film is roughened. Since the roughened surface of the transparent film is smoothed by heating and pressing after a toner image is fixed on the transparent film, no dispersion of incident light will occur when a transparent film is loaded into a projection apparatus, such as OHP or the like. As a result, non-image sections which should primarily be white are reproduced white. Problems such as gray color being mixed in a color image section, or a decrease in both chroma and brightness, are solved.

The aforementioned and other objects, features and advantages of the present invention will become clear when reference is made to the following description of the preferred embodiments of the present invention, together with reference to the accompanying drawings.

BRIEF DESCRIPTION OF THE DRAWINGS

FIG. 3(*a*) shows an example of a conventional light transmitting transparent film in which mat particles are used;

FIG. 3(*b*) to 3(*e*) each show an example of a light transmitting transparent film according to the present invention.

DESCRIPTION OF THE PREFERRED EMBODIMENTS

Figure 1:
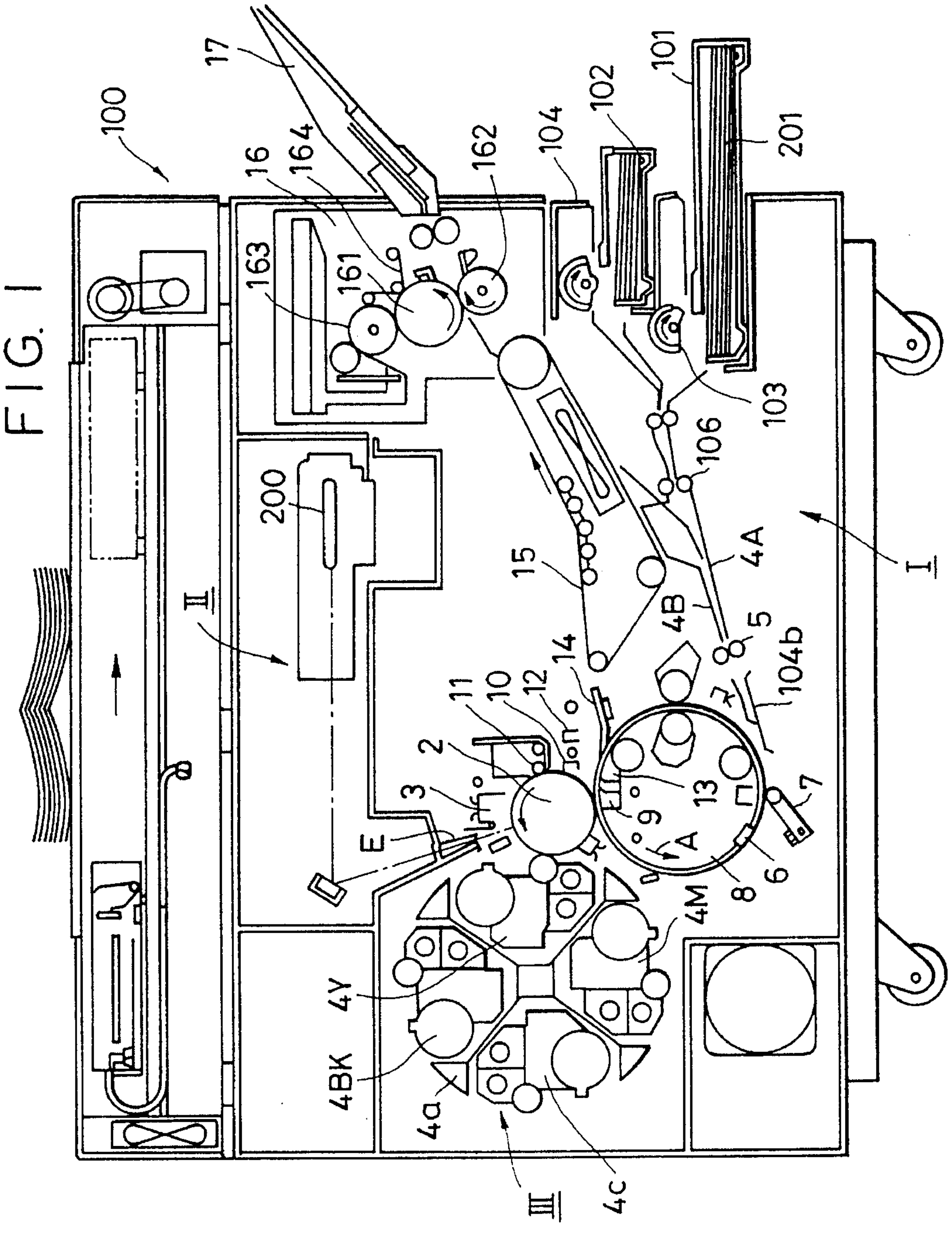
FIG. 1 is a schematic sectional view which illustrates a full color copier which uses light transmitting transparent films according to the present invention.

FIG. 1 is a schematic sectional view which illustrates an electrophotographic apparatus which uses color image light transmitting transparent films on which a full color image can be formed according to the present invention. In FIG. 1, the apparatus can be broadly classified into the systems I, II and III described below:

I) a transfer material transport system I disposed from one side (on the right side in FIG. 1) of an apparatus's main body 100 to the central section of the apparatus's main body 100;

II) a latent image forming section II disposed in close vicinity to a transfer drum 8 which forms the transfer material transport system I, in the central section of the apparatus's main body 100;

III) a development means disposed in close vicinity to the latent image forming section II, namely, a rotary development apparatus III.

The above-described transfer material transport system I is provided with trays 101 and 102 for supplying transfer materials, which are releasably mounted on an opening formed on one side (on the right side in FIG. 1) of the apparatus's main body 100, paper feeding rollers 103 and 104 disposed substantially just above the trays 101 and 102, paper feeding guides 4A and 4B disposed in close proximity to the paper feeding rollers 103 and 104 and equipped with a paper feeding roller 106, and an abutting roller 7, a gripper 6, an electric charger 12 for separating a transfer material and a separation claw 14, all of which are disposed in close proximity to the paper feeding guide 4B and the order of which is from the upstream side in the direction of the rotation to the downstream side in the vicinity of the outer surface, and comprises a transfer drum 8 which is rotatable in the direction of an arrow in FIG. 1, on the inner surface of which a transfer electric charger 9 and an electric charger 13 for separating a transfer material are disposed, a transport belt means 15 disposed in close proximity to the separation claw 14 and a fixing apparatus 16 which is in close proximity to an eject tray 17 which extends outside the apparatus's main body 100 and which can be releasably mounted on the apparatus's main body 100.

The latent image forming section II comprises an image carrier, the outer surface of which is in contact with the outer surface of the transfer drum 8 and which is rotatable in the direction of the arrow in FIG. 1, i.e., a photosensitive drum 2; an electric charger 10 for eliminating electrical charges disposed in the vicinity of the outer surface of the photosensitive drum 2 from the upstream side to the downstream side in the direction in which the photosensitive drum 2 rotates; a cleaning means 11; an image exposing means such as a laser beam scanner for forming electrostatic latent images on a primary electric charger 3 and on the outer surface of the photosensitive drum 2; and an image-exposure reflecting means such as a polygon mirror.

The rotary development apparatus III comprises a rotatable housing 4*a* (hereinafter referred to as "a rotating body") and a yellow developer 4Y, a magenta developer 4M, a cyan developer 4C and a black developer 4BK, which are each installed inside the rotating body 4*a* and which are designed to make visible (i.e., develop) electrostatic latent images formed on the outer surface of the photosensitive drum 2 at a position facing the outer surface of the photosensitive drum 2.

The sequence of the entire image forming apparatus constructed as described above will now be explained taking the case of the full color mode as an example.

When the photosensitive drum 2 rotates in the direction of the arrow in FIG. 1, a photosensitive body on the photosensitive drum 2 is charged uniformly by the primary electric charger 3. When the photosensitive body is charged uniformly by the primary electric charger 3, image photoexposure is performed by a laser beam E modulated by yellow image signals of an original (not shown), and an electrostatic latent image is formed. As the rotary body 4*a* rotates, the above-described electrostatic latent image is developed by the yellow developer 4Y positioned beforehand at a development position.

A transfer material transferred via the paper feeding guide 4A, the paper feeding roller 106 and the paper feeding guide 4B is held by the grippers 6 at a predetermined time and electrostatically wound around the transfer drum 8 by the abutting roller 7 and an electrode facing the abutting roller 7. The transfer drum 8 rotates in synchronization with the photosensitive drum 2 in the direction of the arrow in FIG. 1. A visible image developed by the yellow developer 4Y is transferred by the transfer electric charger 9 at a position where the outer surface of the photosensitive drum 2 is in contact with the outer surface of the transfer drum 8. The transfer drum 8 continues to rotate and is prepared for the transferring of the next color (magenta in the case of FIG. 1).

The electric charges of the photosensitive drum 2 is eliminated by the electric charger 10 for eliminating electric charges. After the photosensitive drum 2 is cleaned by the cleaning means 11, it is charged again by the primary electric charger 3 and undergoes an image photoexposure described above by the next magenta image signal. The above-described rotary development apparatus rotates while an electrostatic latent image is being formed by the magenta signal as a result of the image photoexposure, and positions the magenta developer 4M at the above-described predetermined development position where a predetermined magenta development is performed. Thereafter, the above-described process is performed with cyan and black. When the transferring of four colors is terminated, the electrical charge of a four-color visible image formed on the transfer material are eliminated by the electric chargers 10 and 13. The gripping of the transfer material by the grippers 6 is released and the transfer material is separated from the transfer drum 8 by the separation claws 14. The transfer material is conveyed by the transport belt 15 to a fixing apparatus 16, by means of which it is fixed by heat and pressure. Thus, a series of full-color print sequences is accomplished. As a result, a desired full-color printed image is formed.

Next, an explanation will be given about toner particles used in this electrophotographic apparatus. A so-called sharp-melting toner should preferably be used as toner particles in a color electrophotographic apparatus, because the toner must have excellent melting and color mixing properties when heat is applied thereto. That is, the reason for this is that a sharp-melting toner melts at a low softening point and in a short period of time.

Furthermore, another advantage of using a sharp-melting toner is that the color range for reproducing copies can be expanded and a copy faithful to original's multi-color image can be produced. Such sharp-melting toner is manufactured by a method in which a coloring material (dyes, subliming dyes), an electric-charge controlling agent or the like is melted and kneaded into a binding resin, such as polyester resin or styrene-acrylic type resin, and is ground and classified. If necessary, various other kinds of agents may be added.

A toner in which a polyester resin is used as the binding resin thereof is particularly preferable as a color toner. A polyester resin is excellent in terms of fixing and sharp-melting properties. A sharp-melting polyester resin can be synthesized by copolycondensation of diol compound with dicarboxylic acid, forming a polymer compound by ester binding in which the principle chain of molecules.

Polyester resins, in particular, obtained by copolycondensing bisphenol types and polycarboxylic acid components, represented by the formula described below, are preferable because they have a sharp melting characteristic:

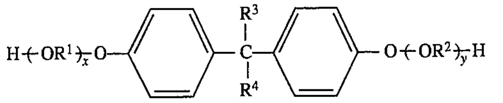

In the formula, $R^1$ and $R^2$ are ethlene or propylene groups, respectively; $R^3$ and $R^4$ are one or more hydrogen and carbon atoms, respectively, selected from alkyl groups which are capable of having one to five hydrogen and carbon atoms. They may be the same in number, and may be connected to each other, forming a ring; The values x and y are each positive numbers of one or greater; and an arithmetic mean value of x+y is 2 to 10.

For diol components, as well as bisphenol types, one or more types selected from its derivatives and substituents may be used. For carboxylic acid components, as well as free acid, one or more types selected from its acid anhydride and sub-alkyl ester may be used. Preferable diol components may include bisphenol A, bisphenol F, 1,1-bis (4-oxyphenyl) ethane, or 1, 1-bis (4-oxyphenyl) cyclohexane.

Polycarboxylic acid components may include fumaric acid, maleic acid, maleic acid anhydride, phthalic acid, terephthalic acid, trimellitic acid, pyromellitic acid, or the like. Of them, terephthalic acid and isophthalic acid are preferable.

Figure 2:
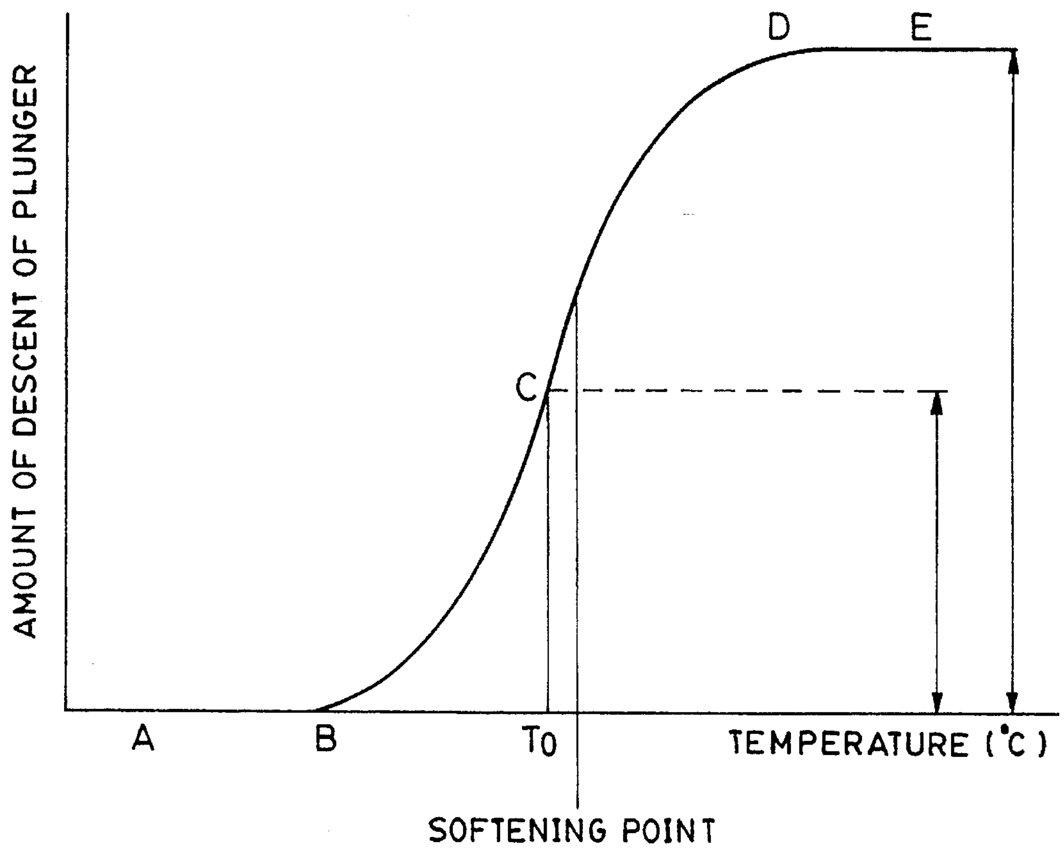
FIG. 2 is a melting characteristic view of toner used to form an image on a light transmitting transparent film according to the present invention.

A softening point of a sharp-melting polyester resin should be selected from 75° to 150° C., and preferably from 80° to 120° C. The softening characteristic of a toner containing this sharp-melting polyester resin as a binding resin is shown in FIG. 2.

A melt flow measuring instrument [product name: Flow Tester CET-500 Model (manufactured by Shimazu Seisakusho k.k.)] is used to determine the relationship of the temperature to the amount of descent of the plunger (hereinafter referred to as "a S-shaped softening curve") of a toner, plotted when it is heated at a constantly increasing rate of 6° C./min. at a uniform speed at an initial temperature of 70° C. after a lapse of of 300 seconds for preheating under an applied extrusion load of 20 kgf with the diameter of a die (nozzle) being set at 0.2 mm and the thickness thereof 1.0 mm. Fine powder of 1 to 3 g should be accurately weighed and used as the toner as a sample, and the cross section of a plunger set at 10 $cm^2$. The S-shaped softening curve assumes the shape shown in FIG. 2. The toner is gradually heated at a uniform rate, and discharge is started (the plunger descends A→B). When it is heated further, the toner flows out in a molten state in large amounts (B→C→D). The plunger stops descending and the discharge is terminated (D→E).

The height H of the S-shaped softening curve indicates the total amount of discharge. A temperature $T_O$corresponding to a point C at H/2 indicates a practical softening point of the toner. This measuring method can also be used to measure the heat melt characteristics of the resin itself used to form a binding resin and a second transparent resin layer.

Such a sharp-melting toner or resin refers to a resin which satisfies the following condition: if a temperature is $T_1$ when a melt viscosity is $\mathbf{10_3}$ cps, and the temperature is $T_2$ when it is $5\times10^2$ cp, then:

$$T_1=90° \text{ to } 150° \text{ C.}$$

$$|\Delta T=|T_1-T_2|=5° \text{ to } 20° \text{ C.}$$

One characteristic of a toner or resin having this temperature - melt viscosity characteristic (sharp-melting property) is that a sharpdecrease in the viscosity is caused by heating. Such a decrease in the viscosity causeş an appropriate mixture of the topmost toner layer with the bottommost toner, and further causes the transparency of the toner layer itself to increase sharply. This is considered to contribute to an excellent subtractive mixture.

When such a toner is used, the quality of the image on the transfer material, such as ordinary paper, is not affected much as long as it is seen with the naked eye. Since the image to be seen visually is an image obtained by reflected light which is incident on the fixed image, even if a small amount of particles remains on the surface of the toner, it is difficult to see. However, when the same image is observed by transmitted light as in an OHP (overhead projector), an impression is given that the light transmitting properties have decreased due to the dispersion of light because of the shape created when toner particles remain. The binding resin contained in toner particles should be one which is soluble into the second transparent resin of the transparent film.

A typical construction of a transparent film of the present invention is shown in FIG. 3(*b*). Reference numeral 31 denotes a first transparent resin layer which is a base film. The first transparent resin layer is not considerably deformed (an evaluation based on D1637 of ASTM) by heating (usually 100° C. or more) during fixing. It is a heat-resistant resin film the maximum operating temperature of which is 100° C. or more. For materials thereof, for example, polyethylene terephthalate (PET) , polyamide (nylon) , polymide, etc. are used. Of these materials, polyethylene terephthalate is particularly preferable in terms of resistance to heat and transparency. The film thickness of the first transparent resin layer 31 should be such that when the layer is softened by heating during fixing, it does not wrinkle. In the case of the above-mentioned materials, the thickness of the first transparent resin layer 31 should be 50 µm or greater. The thickness of the layer 31 should be selected from 200 µm or smaller, and preferably from 150 µ m or smaller. This upper limit is a limitation which arises from the fact that a decrease in the light transmitting factor caused by an increase in the film thickness should be suppressed to an allowable range for practical purposes even if a transparent resin layer is used.

Reference numeral 32 denotes a topcoat layer which forms a second transparent resin layer laminated to increase the light transmitting property of an image after fixing. For the material resin of the layer 32, it is preferable that it be capable of being melted into a binding resin contained in the toner which forms the image in the area of temperatures during heating and fixing. Being melted into a binding resin of a toner means that no boundary is formed between the resin of the layer 32 and the toner resin in the image after fixing.

Regarding a guideline for selecting a resin, resins should preferably be used in which the value of a solubility parameter ($SP_R$) of a material resin which forms the layer 32 is within±1.5 with the value of a solubility parameter ($SP_T$) Of a toner resin as the center, and more particularly within±1.0. Solubility parameters of resins are described in publications, such as polymer handbooks. For example, when the polyester resin described above is used as a binding resin, because the value of the solubility parameter ($SP_T$) Of the resin is 11.0 or thereabout, resins having a solubility parameter in the range of 11.0±1.5 may be used as material resins of the layer 32. For example, thermoplastic resins, such as polyester resin (PET), polymethyl methacrylate resin (PMMA), hardening agent non-mixed epoxy resin, hardening agent non-mixed polyurethane resin, vinyl chloride resin (PVC), vinyl chloride -vinyl acetate copolymer, etc., can be used.

The modulus of storage elasticity of the second transparent resin at 160° C. should preferably be 100 to 10,000 dye/$cm^2$. The modulus of storage elasticity can be measured by using a Dynamic Spectrometer RDS7700 Series II manufactured by Rheometrics Inc. The thickness of the layer differs depending upon the size of toner particles to be used. To make light sufficiently transmit the part of a low-concentration toner having a thickness of only one toner particle as an image, a thickness of half or more of an average value of the size of the toner is necessary. However, if the thickness of the layer 32 becomes three times the size of the toner particles, the amount of a molten resin becomes too much. In such a case, not only blurring of an image and distortion are caused, but also cracks of the layer 32 (image) are caused due to bending. Therefore, the thickness of the layer 32 should preferably be set at ½ or above, and twice or less than the average value of a toner volume particle size.

In the present invention, the average particle size of a toner refers to a value measured on the basis of the method described below:

A particle size measuring instrument [Product Name: Coulter Counter Model TA-II (manufactured by Coulter Counter, Inc. )] is used. An Interface (manufactured by Nikkaki K.K.), for outputting the distribution of the number of pieces, volume distribution, the average number of pieces and the average volume and a personal computer [Product Name: CX-1 (manufactured by Canon, Inc. )] are connected to each other. Sodium chloride (a reagent, first class) is used as an electrolytic solution and a sodium chloride water solution (concentration 1: weight%) is prepared.

A measurement method is as follows: a surface active agent, preferably 0.1 to 5 ml of alkyl benzen sulfonate substituted with alkyl group of 10 to 18 carbon atoms, is added into 100 to 150 ml of the above-mentioned electrolytic solution (a salt water solution), and further 0.5 to 50 mg of a measurement sample, usually 2 to 20 mg thereof, is added.

A dispersion process is performed on the electrolytic solution in which the sample is suspended for about 1 to 3 minutes by using an ultrasonic dispersion apparatus. The grit distribution of particles having a particle size of 2 to 40 μm is measured by using a 100 μm aperture in the above-described Coulter Counter Model TA-II, and a volume average particle size is determined from this distribution.

Reference numeral 35 denotes resin particles for roughening the surface of the layer 32. Resin particles by which a roughened surface is smoothed out by heating and pressure are used as resin particles. As shown in FIG. 3(*b*), after the second transparent resin layer is formed on the first transparent resin layer 31 having resistance to heat, the surface thereof is coated with resin particles 35 for roughening the surface. The surface-roughening particles 35 used in this embodiment possess the property of melting into the second transparent resin and are formed by a resin having a thermally viscous elasticity characteristic close to that of the resin in a fixing temperature area. Particles in which the second transparent resin is finely ground or particles of a binding resin contained in toner particles are preferably used as resin particles.

A roughened surface is formed by dispersing the resin particles 35 on the surface of the second transparent resin layer in a dry state and by exposing the surface to a vapor atmosphere of a solvent, such as methyl ethyl ketone, acetone, or methanol after dispersion. At the same time, the roughened surface is provided with a binding property with the second transparent resin layer. However, when it is exposed to the atmosphere of the solvent vapor, processing conditions, such as a concentration of the solvent or exposure time, must be appropriately set according to a resin or solvent to be used so that the roughness of the formed surface will not be degraded because of the resin particles.

A method for forming a transparent film in which resin particles are provided according to the present invention includes one in which a resin for forming the above-mentioned layer 32 is dissolved into a volatile organic solvent composed from the alcohol family, such as methanole or ethanole, or ketone types, such as methyl ethyl ketone or acetone, on the layer 31, and in which coating is performed by using an appropriate coating method, such as a bar coat method, a dip coat method, a spray coat method, or a spinner coat method, and then dry is performed. In some instances, to increase the contact of the layer 32 with the layer 31 in order to prevent the image from being peeled away during and after fixing, a bonding layer 33, which is soluble into both the layer 31 and the layer 32, highly heat-resistant, and difficult to dissolve by heating during fixing, may be provided as required, as shown in FIG. 3(*b*).

Resins which can be used as a bonding layer include polyester resin, acrylic ester resin, ester methacrylate resin, styrene-acrylic ester copolymer resin, or styrene-ester metacrylate copolymer resin.

The average volume diameter of the resin particles 35 should preferably be between 0.1 and 10 μm, and more particularly between 0.1 and 5 μm. If they are too large, the graininess of the resin particles is liable to remain after a toner image is fixed. The base (the non-image area) turns gray when a light transmitting image is formed. If it is too small, as a result of the transportability inside the apparatus becoming comparable to that of a non-roughened film, a phenomenon, such as film jamming, is liable to occur. A rough surface formed by using resin particles should preferably be treated so that the surface roughness becomes 0.1 to 10 μm, and preferably 0.5 to 5 μm, expressed by an average roughness ($R_z$) according to a ten point method.

FIG. 3(*a*) shows a transparent film, the surface of which is roughened by making conventional mat particles 34, silicon dioxide or alumina be contained on the second transparent resin layer 32. Although this transparent film has sufficient characteristics as to the transporting property inside the apparatus, incident light is dispersed when this film is loaded into a projection apparatus, such as OHP, because particles remain after the image is fixed. As a result, not only a non-image section which should primarily be white becomes gray, but also a color image section is mixed with gray, causing a decrease in both coloring and brightness.

The surface of the second transparent resin layer may be roughened by simply polishing the surface thereof. The degree of the surface roughening at this time should preferably be 400 to 3000 mesh, and more particularly 400 to 2500 mesh. The surface of the second transparent resin layer may be roughened by pressing the surface with a member having a great number of small projections on the surface thereof. Furthermore, it may be roughened by spraying a resin melted by heating onto the surface of the second transparent resin layer. In both cases, the surface of the second transparent resin layer should preferably be such that Bekk smoothness (JIS P8119) is 80 to 1,000 seconds, and more particularly 200 to 800 seconds. The roughened surface of the second transparent resin layer should preferably be such that it can be smoothed out by heating (lower than 200° C., and more particularly 185° C.) and pressure.

Various embodiments Of the present invention will be described below.

(First Embodiment)

A solution in which a polyester resin P1 [a value of a solubility parameter: about 11, a storage elasticity modulus (G') at 160° C.: 1,000 dyne/$cm^2$ and a softening point: 116° C.] was dissolved into acetone is applied, by a bar coat method, onto the first transparent resin layer of a biaxially oriented polyethlene terephthalate resin film (film thickness: 100 μm, heat distortion temperature: 152° C., and the maximum operating temperature: 150° C). The second transparent resin layer having a thickness of 16 μm after drying is formed, and a transparent film F1 is produced.

Furthermore, particles (an average particle size: 5 μm) of the above-mentioned polyester resin P1 are provided 100 pieces per $cm^2$ on the surface of the second transparent resin layer by an electrostatic painting method. Then, it is exposed to a methyl ethyl ketone vapor atmosphere, and the particles are bound on the surface of the second transparent resin layer, thereby roughening the surface. The surface smoothness of the produced transparent film was 600 seconds, expressed by the Bekk smoothness. No treatment was performed on the rear surface of the transparent film. The produced transparent film assumed the cross section shown in FIG. 3(*b*).

The transparent film obtained as described above is cut out to A4 size. Several tens thereof were stacked on one another, and they were loaded into a cassette 102 of an image forming apparatus shown in FIG. 1. In this way, a paper feeding test was carried out. The roughened surface of the transparent film was made to face downward so that the rear surface of each of the transparent films is brought into contact with the roughened surface.

When the paper feeding test was carried out with ten films stacked successively on one another, neither sliding by the paper feeding roller 103 nor double feeding occurred. It was confirmed that the films were fed one by one. Similar kinds of experiments were carried out several times, and the same results were obtained.

Next, a yellow toner was prepared by using 100 parts by weight of a sharp-melting polyester resin $P_2$ [a solubility parameter: about 11, a storage elasticity modulus (G') at 160° C.: 8 dyne/$cm^2$, a softening point: 105° C., a temperature $T_1$ at which a seeming melt viscosity of $10_3$ poise is shown: 123° C., a temperature $T_2$ at which a seeming melt viscosity of $5\times10^2$ poise is shown: 131° C., and $|T_1-T_2|$=8° C.], 3.5 parts by weight of a yellow coloring agent and 4 parts by weight of chromium-contained organic complexes.

The quality values of the yellow toner are:

volume average particle size: 12 μm storage elasticity modulus (G') at 160° C.: 10 dyne/$cm^2$ softening point: 107° C.

temperature $T_1$ (at which a seeming melt viscosity of $10^3$ poise is shown): 125° C.

temperature $T_2$ (a seeming melt viscosity of $5\times10^2$ poise is shown): 134° C.

$|T_1|T_2|$=9° C.: indicates that the yellow toner has a sharp-melting property.

A yellow toner image was uniformly formed by using 4 per cent by weight of an yellow toner in which 100 parts by weight of a resin coat ferrite carrier and 0.4 parts by weight of hydrophobic colloidal silica are added, by the use of an image forming apparatus shown in FIG. 1 (the obverse layer of a heat fixing roller 161 is formed of silicone rubber, and the obverse layer of a heat fixing roller 162 is formed of fluororesin) so that the fixing image concentration becomes 1.5 (a Macbeth reflection densitometer). This image was transferred to a transparent laminate film.

This yellow toner image which is not yet fixed was hot-press fixed by a hot-press fixing apparatus in which a hot-press fixing roller [dimethyl silicone oil (viscosity: 100 cs) was applied as a releasing agent] is installed under the conditions of a hot-press fixing roller temperature of 160° C., an average heating time of 25 msec, and an applied pressure of 3 kgf/$cm^2$ The fixed yellow toner image formed on the transparent film F1 was observed. It was confirmed that the resin particles provided dissolved into the second transparent resin layer 32 and no adverse influence was exerted upon the image. The cloudiness of the white section of the light transmitting image was 4% or less after fixing, though it was 8% before fixing. This cloudiness is comparable to that of a film in which resin particles are not provided from the beginning, and no adverse influence was exerted upon the prepared yellow image.

(Comparative Example 1)

Mat particles having an average particle size of 17 μm formed of silicon dioxide particles were mixed into a polyester resin $P_1$ for the second transparent resin layer used in the first embodiment. A painting solution obtained after they are kneaded uniformly is painted on the surface of the first resin layer 31 by a bar coat method so that the thickness of the resin becomes 14 μm.

A transport test similar to that in the first embodiment and a transmitted image test using OHP were carried out.

Results comparable to those in the case in which the transparent film of the embodiment was used were obtained as regards the transportability during transportation. However, in the transmitted image, first a white section became dark because of the mat particles. Furthermore, a yellow colored section became ocherous. The image deteriorated due to the adverse influence by the mat particles.

(Second Embodiment)

The surface of the transparent film F1 shown in the first embodiment is rubbed substantially uniformly with sand paper of roughness No. 2,000, forming a roughened surface shown in FIG. 3(*b*) on the surface of the second transparent resin layer 32. The surface of the obtained transparent film is in a cloudy glass state, and the cloudiness was 10% or more.

When a transport test similar to that in the first embodiment was carried out using this transparent film, excellent results were obtained. Furthermore, when the image was output on the surface of this transparent film by using the yellow toner described in the first embodiment, the roughened surface on the transparent film was almost lost after it passed the fixing apparatus, and the cloudiness of the non-image section was 4% or less. Concerning the transmitted image, excellent results similar to those of the first embodiment were obtained.

(Third Embodiment)

By using a stainless roller, the surface of which is substantially uniformly roughened (roughness of 2 to 3 m by $R_z$) by spherical glass beads having a diameter of 40 to 50 μm, the surface of this roller was heated up to 110° C. Another roller made of silicon rubber (a roller, on the iron core of which a silicon rubber layer is formed into a thickness of 5 mm) is disposed under pressure so as to face the former roller, thus forming a pair of rollers.

Next, the transparent film F1 described in the first embodiment is sandwiched between the pair of rollers, and a transparent film is transported by rotating this pair of rollers. A roughened surface shown in FIG. 3(*d*) which is the same as the surface of the stainless roller was formed on the surface of the film by pressure applied at this time and heat.

Next, when a transport test similar to that of the second embodiment and a transmission image test of an image obtained by forming a yellow image on a film by using this transparent film were carried out, results similar to those of the second embodiment were obtained.

(Fourth Embodiment)

A non-hardening epoxy resin [a value of a solubility parameter: 10.5, a softening point: 114° C., a storage elasticity modulus (G') at 160° C.: 800 dyne/$cm^2$, and weight average molecule quantity: 20,000] was heated to above 180° C. or higher and made into a liquid having a viscosity of $10^2$ poise. This was then sprayed by an air spray onto the surface of the second transparent resin layer of the transparent film F1 described in the first embodiment. The surface of the film obtained was as shown in FIG. 3 (*e*) . When a test similar to that of the second embodiment was carried out using this film, results similar to those of the second embodiment were obtained.

(Fifth Embodiment)

When a full color image was formed on films (films of the first to fourth embodiments) by using magenta and cyan black toners in addition to a yellow toner and the transmitted light-transmitting image was observed, adverse influences due to surface roughening particles were not observed. An excellent image comparable to that produced by those not containing roughening particles was obtained.

(Sixth Embodiment)

Fine particles having a volume average particle size of 5 μm [measured by using an apparatus, Product Name: Coulter Counter Model TA-II (manufactured by Coulter Counter, Inc. )] obtained by grinding a sharp-melting polyester resin $P_2$, as a polyester resin, [a solubility parameter ($SR_R$): about 11, a softening point: 105° C., a temperature $T_1$ at which a seeming melt viscosity of $10^3$ poise is shown: 123° C., a temperature $T_2$ at which a seeming melt viscosity of $5\times10^2$ poise is shown: 131° C., a storage elasticity modulus (G') at 160° C.: 8 dyne/$cm^2$, and $|T_1-T_2|=8°$ C.] were sprayed onto the surface of the transparent film F1 produced by an electrostatic painting method in such a way that the particles are distributed approximately 100 pieces per $cm^2$. Next, they are exposed to an acetone vapor atmosphere and bound onto the surface of the second transparent resin layer. The surface smoothness of the obtained transparent film was 800 seconds according to the Bekk smoothness. No treatment was performed on the back surface of the laminate layer film. The cross section of the obtained surface-roughened laminate layer film assumed the shape shown in FIG. 4(*a*).

Each of the transparent films obtained as described above was cut out to A4 size. Several tens thereof were stacked on one another, and they were then loaded into a cassette 102 of an image forming apparatus shown in FIG. 1. In this way, a paper feeding test was carried out. The roughened surface of each of the transparent films was made to face downward so that the rear surface of each of the transparent films was made to face the roughened surface.

When a paper feeding test was carried out with ten films being stacked in succession on one another, neither sliding by the paper feeding roller 103 nor double feeding occurred. It was confirmed that the films were fed one by one. Similar kinds of experiments were carried out several times, and the same results were obtained.

Next, a yellow toner was prepared by using 100 parts by weight of a sharp-melting polyester resin $P_2$,3.5 parts by weight of a yellow coloring agent and 4 parts by weight of chromium-containing organic complexes.

The quality values of the yellow toner were:

volume average particle size: 12 μm storage elasticity modulus (G') at 160° C.: 10 dyne/$cm^2$ softening point: 107° C.

temperature $T_1$ (at which a seeming melt viscosity of $10^3$ poise is shown): 125° C.

temperature $T_2$ (a seeming melt viscosity of $5\times10^2$ poise is shown): 134° C.

$|T_1-T_2|=9°$ C.: indicates that the yellow toner has a sharp-melting property.

A yellow toner image was uniformly formed by using 4 per cent by weight of a yellow toner, in which 100 parts by weight of a resin coat ferrite carrier and 0.4 parts by weight of hydrophobic colloidal silica were added, by the use of the image forming apparatus shown in FIG. 1 (the obverse layer of a heat fixing roller 161 was formed of silicone rubber, and the obverse layer of a heat fixing roller 162 was formed of fluororesin) so that the fixing image concentration became 1.5 (a Macbeth reflection densitometer). This image was transferred to a transparent laminate film. This yellow toner image which is not yet fixed was hot-press fixed by a hot-press fixing apparatus.

In the fixing apparatus, a hot-press fixing roller [dimethyl silicone oil (viscosity: 100 cs) was applied as a releasing agent] is used to hot-press fix under the conditions of a hot-press fixing roller temperature of 160° C., average heating time of 25 msec, and an applied pressure of 3 kgf/$cm^2$. The fixed yellow toner image formed on the transparent film F1 was the observed.

It was confirmed that the resin particles provided dissolved into the second transparent resin layer 32 and no adverse influence was exerted upon the image. The cloudiness of the white section of the light transmitting image was 4% or less after fixing, though it was 7% before fixing. This cloudiness is comparable to that of a film in which resin particles are not provided from the beginning. This cloudiness is equal to or slightly lower than that of a film in which the resin particles 35 were not provided from the beginning. What is more, an adverse influence, such as blackening, caused by the resin particles were not observed in the obtained yellow light-transmitting image, and the image obtained had a high coloring.

(Seventh Embodiment)

A liquid material in which the resin P2 for toner powder described in the sixth embodiment was heated up to 150° C. and made to have a low viscosity (viscosity: $10_2$ poise) was sprayed by an air spray onto the surface of the topcoat layer of the transparent film F1 described in the first embodiment.

Figure 4:
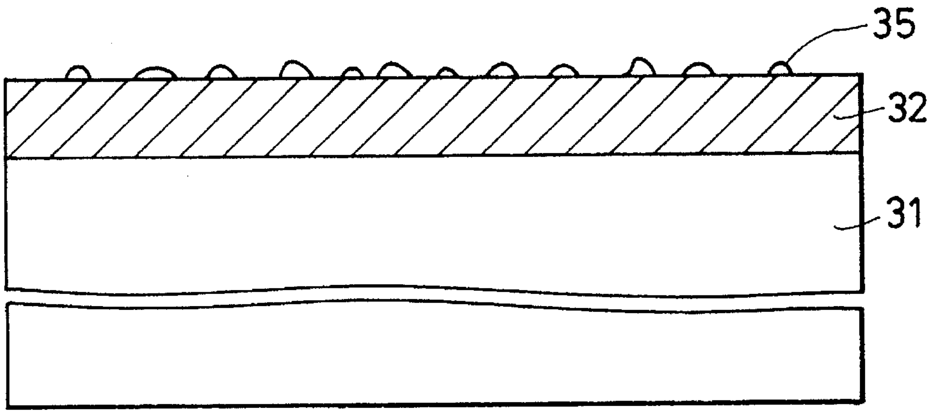
FIGS. 4(*a*) to 4(*c*) are cross-sectional views which illustrate a light transmitting transparent film according to the present invention.
Figure 4:
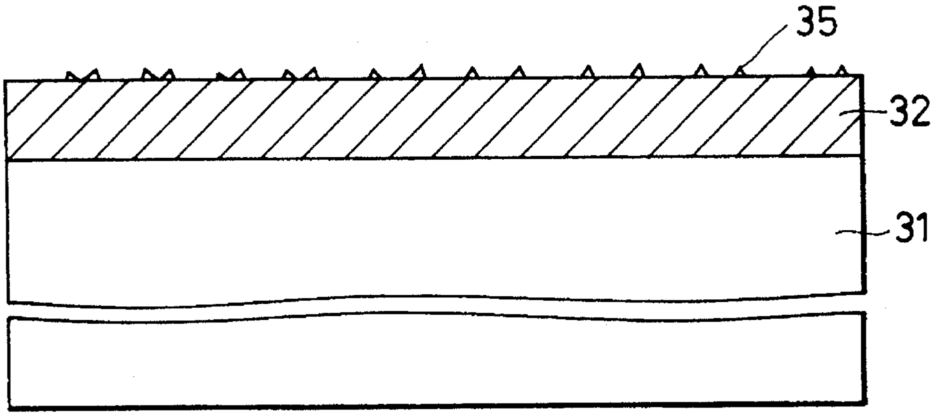
Figure 4:
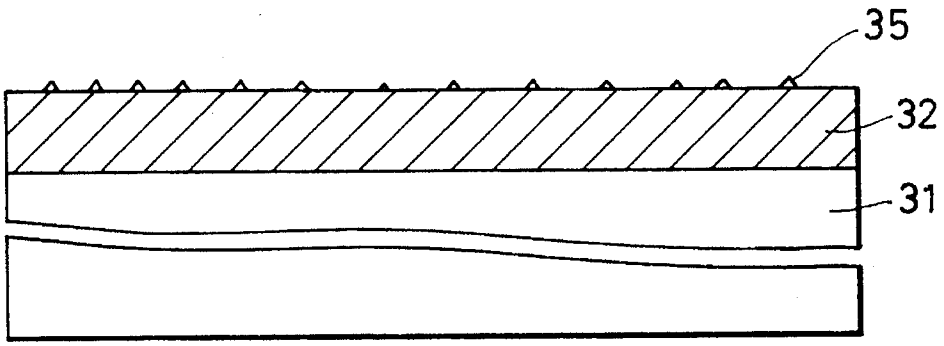

The obtained transparent film assumed the form of lotus leaves because of the collision of fine resin particles with the surface of the film, as shown in the schematic view of FIG. 4(*b*). The surface roughness was 600 seconds according to the Bekk smoothness.

Next, this film was cut out to A4 size in the same manner as in the sixth embodiment, and a paper supply and feeding test was carried out. The results were excellent such that the paper jamming rate was 0.001 or less, namely, jamming was 1 or less among 1,000 pieces of paper supplied. This rate is comparable to that of the sixth embodiment, so excellent feeding was possible.

In addition, a magenta toner having a volume average particle size of 12 μm was prepared in the same manner as in the sixth embodiment, exept that 1.9 parts by weight of a magenta coloring agent were used. This magenta toner had a storage elasticity modulus of 8 dyne/$cm^2$ at 160° C. and its softening point was 106° C. It had a sharp-melting toner property.

A solid magenta image, the image concentration of which was 1.5 due to the use of this toner, was transferred and fixed to the above-mentioned transparent film. As a result, no adverse influence because of the resin particles was observed in the light-transmitting image. A clear light-transmitting image was obtained without decreasing the coloring of the magenta. The cloudiness of the light-transmitting white section decreased from 10% before fixing to 3% after fixing. This cloudiness is nearly equal to the value of the transparent film F1 before the resin particles were provided.

(Eighth Embodiment )

A corrosion-resistant (stainless) steel roller [the surface is coated with fluororesin of polytetrafluoroethylene (PTFE) or the like to a thickness of 10 to 100 μm] and a roller (a silicon rubber layer thereof being formed on an iron core metal to a thickness of 5 mm) which rotates while facing the former roller, which form a pair of rollers, were prepared. The roller coated with fluororesin was heated so that the temperature at the surface thereof was set at 130° C.

Next, powder obtained by finely grinding a hardening non-mixed epoxy resin [a solubility parameter: 10.0, a softening point: 96° C., a storage elasticity modulus (G') at 160° C.: 10 dyne/$cm^2$, and a weight average molecule quantity (Mw: 3,000] was applied, as resin particles, by a well-known electrostatic painting method, onto the surface of the transparent film F1 described in the first embodiment, as in the sixth embodiment, so that these particles were distributed 40 pieces on the average per $cm^2$. This transparent film was then made to pass between the pair of rollers. The peripheral speed of the rollers was set at 300 mm/sec.

The surface of the transparent film after passing through the pair of rollers became cloudy as a result of the shape of the hardening non-mixed epoxy resin powder being disturbed by the above-mentioned fluororesin coat roller. The surface at this time assumed the shape shown in FIG. 4.

Next, a paper supply/transport test similar to that of the sixth embodiment was carried out by using this surface-roughened transparent film. The characteristics of both tests were excellent, as neither paper jamming not double feeding occurred.

In addition, a full color image was formed on the transparent film, the surface of which was roughened by the hardening non-mixed epoxy resin powder by using cyan and black toner in addition to the yellow and magenta toners used in the sixth and seventh embodiments. The image was then transferred and fixed. When the obtained image was observed as a light-transmitting image, the cloudiness of the white section observed before fixing was lost after fixing. The cloudiness decreased to 4% or less. There were no problems remaining in the image section, and an excellent full color light-transmitting image was obtained.

Many different embodiments of the present invention may be constructed without departing from the spirit and scope of the present invention. It should be understood that the present invention is not limited to the specific embodiments described in this specification, and is only limited in the appended claims.

What is claimed is:

1. A light-transmitting transparent film, comprising:

a first transparent resin layer which is a base film, said base film including, a heat resistant resin film with a maximum operating temperature of at least 100° C.; and a second transparent resin layer, the surface of which is a roughened surface which can be smoothed out by heating and pressure and thereby dispersion of incident light can be prevented, wherein the roughness ($R_z$) is 0.1 to 10 μm and said second transparent resin has a free surface.

2. An light-transmitting transparent film according to claim 1, wherein the roughened surface of the second transparent resin layer is formed of a second transparent resin and particles of a resin having binding properties and being soluble into the second transparent resin, said particles having solubility parameters within ±1.5 of the second transparent resin.

3. An light-transmitting transparent film according to claim 2, wherein the average volume diameter of is said particles 0.1 to 10 μm.

4. An light-transmitting transparent film according to claim 2, wherein said particles of the resin are contained in a toner which forms the image.

5. An light-transmitting transparent film according to claim 1, wherein a roughened surface of the second transparent resin layer is formed by polishing the surface of the second transparent resin layer with a member producing a specified roughness expressed in 400 3000 mesh size.

6. An light-transmitting transparent film according to claim 1, wherein the roughened surface of the second transparent resin layer is formed by pressing a member having small projections on the surface thereof against the surface of the second transparent resin layer.

7. An light-transmitting transparent film according to claim 1, wherein the roughened surface of the second transparent resin layer is formed by heating and melting a resin which is soluble into the second transparent resin and by spraying it onto the surface of the second transparent resin layer.

8. An light-transmitting transparent film according to claim 1, wherein the roughened surface of the second transparent resin layer is 80 to 1,000 seconds according to the Bekk smoothness method.

9. A light-transmitting film according to claim 1, wherein the first transparent resin layer does not develop substantial heat distortion by heating at 100° C.

10. An light-transmitting transparent film according to claim 9, wherein the roughened surface of the second transparent resin layer is capable of being smoothed out by heating above room temperature to maximum of 200° C. or less and pressure, and wherein the value of the storage elasticity modulus of the second transparent resin layer is 100 to 10,000 dyne/$cm^2$.

11. A light-transmitting transparent film according to claim 1, wherein the average roughness of said roughened surface ($R_z$) is 0.5 to 5 μm.

12. A light-transmitting transparent film comprising:

a first transparent resin which is a base film, said base film including, a heat resistant resin film with a maximum operating temperature of at least 100° C., a second transparent resin layer, the surface of which is a roughened surface which can be smoothed out by heating and pressure, thereby dispersion of incident light can be prevented, wherein the roughened surface of the second transparent resin layer is 80 to 1,000 seconds according to the Bekk smoothness method, said second transparent resin layer having a free surface.

13. An light-transmitting transparent film according to claim 12, wherein the roughened surface of the second transparent resin layer is 200 to 800 seconds according to the Bekk smoothness method.

14. A light-transmitting transparent film according to claim 1, wherein the roughened surface can be smoothed out by said heating and pressure when fixing a toner image on said light-transmitting transparent film.

15. A light-transmitting transparent film according to claim 12, wherein the roughened surface can be smoothed out by said heating and pressure when fixing a toner image on said light-transmitting transparent film.

* * * * *

UNITED STATES PATENT AND TRADEMARK OFFICE

CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

ON THE TITLE PAGE:

[56] RC

"4,8523,274" should read --4,853,274--.

COLUMN 1

Line 64, "a" should read --an--.

COLUMN 2

Figure 3A:
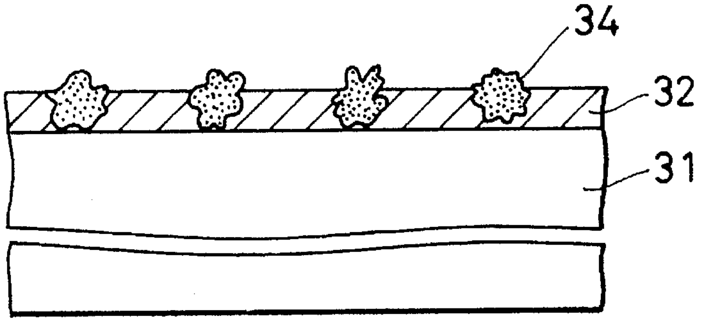
FIGS. 3 (*a*) to 3 (*e*) are cross-sectional views which illustrate various surface-roughened light transmitting transparent films.
Figure 3B:
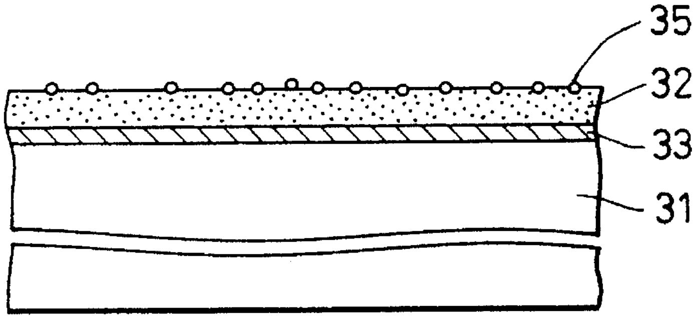
Figure 3C:
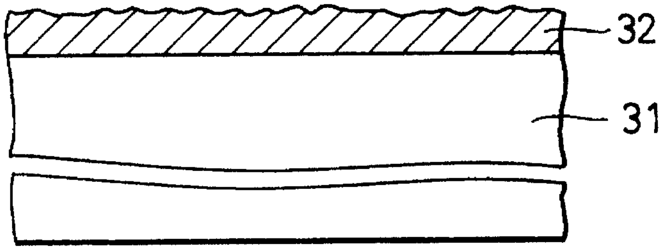
Figure 3D:
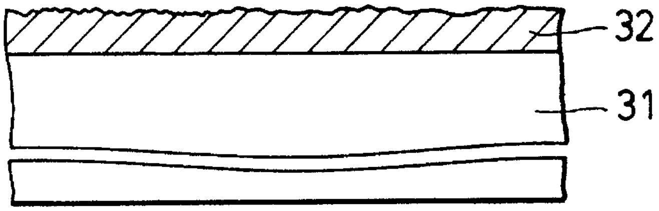
Figure 3E:
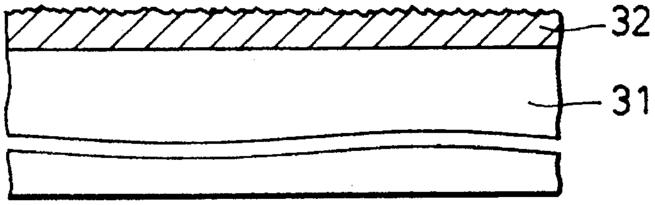

Line 47, "FIG. 3(b)" should read --FIGS. 3(b)--.

COLUMN 4

Line 63, delete "in which".

COLUMN 5

Line 38, "of of" should read --of--.

Line 58, "$10_3$ cps," should read --$10^3$ cps,--.

UNITED STATES PATENT AND TRADEMARK OFFICE
CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

COLUMN 5

Line 59, "cp," should read --cps,--.

Line 63, "|ΔT=" should read --|ΔT|=--.

Line 67, "sharpdecrease" should read --sharp decrease--.

COLUMN 6

Line 54, "within±1.5" should read --within ±1.5--.

Line 55, "within±1.0." should read --within ±1.0.--.

Line 59, "Of" should read --of--.

UNITED STATES PATENT AND TRADEMARK OFFICE

CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

COLUMN 7

Line 3, "dye/$cm^2$." should read --dyne/$cm^2$.--

COLUMN 8

Line 10, "nole" should read --nol-- and "ethanole," should read --ethanol,--.

Line 14, "dry" should read --drying--.

Line 66, "Of" should read --of--.

COLUMN 9

Line 41, "$10_3$ poise" should read --$10^3$ poise--.

Line 56, "$|T_1|T_2|=9°C.:$" should read --$|T_1-T_2|=9°C.:$--.

Line 59, "an" should read --a--.

UNITED STATES PATENT AND TRADEMARK OFFICE

CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

COLUMN 10

Line 61, "3 m" should read --3 μm--.

COLUMN 12

Line 8, "$P_{2}$,3.5" should read --$P_2$, 3.5--.

Line 40, "the" should read --then--.

Line 58, "resin P2" should read --resin $P_2$--.

COLUMN 13

Line 40, "(Mw: 3,000]" should read --(Mw: 3,000)]--.

Line 55, "not" should read --nor--.

UNITED STATES PATENT AND TRADEMARK OFFICE

CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

COLUMN 14

Line 18, "An" should read --A--.

Line 24, "An" should read --A--.

Line 25, "is" should be deleted.

Line 26, "particles" should read --particles is--.

Line 27, "An" should read --A--.

Line 30, "An" should read --A--.

Line 34, "400 3000" should read --400 to 3000--.

Line 35, "An" should read --A--.

UNITED STATES PATENT AND TRADEMARK OFFICE

CERTIFICATE OF CORRECTION

PATENT NO. : 5,482,760

DATED : January 9, 1996

INVENTOR(S) : TAKEUCHI

It is certified that error appears in the above-identified patent and that said Letters Patent is hereby corrected as shown below:

COLUMN 14

Line 39, "An" should read --A--.

Line 45, "An" should read --A--.

Line 52, "An" should read --A--.

COLUMN 15

Line 7, "An" should read --A--.

Signed and Sealed this

Ninth Day of July, 1996

Attest:

BRUCE LEHMAN

Attesting Officer

*Commissioner of Patents and Trademarks*